United States Patent [19]

Yamaji et al.

[11] Patent Number: 5,578,809
[45] Date of Patent: Nov. 26, 1996

[54] CODE DATA READ APPARATUS FOR PHOTOGRAPHIC FILM

[75] Inventors: Yoshiyuki Yamaji; Yukimasa Naka; Shigetaka Nakamura, all of Wakayama, Japan

[73] Assignee: Noritsu Koki Co., Ltd., Wakayama, Japan

[21] Appl. No.: 619,235

[22] Filed: Mar. 21, 1996

Related U.S. Application Data

[63] Continuation of Ser. No. 343,941, Nov. 17, 1994, abandoned.

[30] Foreign Application Priority Data

Nov. 18, 1993 [JP] Japan .................................. 5-289410

[51] Int. Cl.$^6$ ............................................................ G06K 7/10
[52] U.S. Cl. ............................................. 235/462; 235/454
[58] Field of Search .................................. 235/454, 455, 235/462, 472, 494

[56] References Cited

U.S. PATENT DOCUMENTS

| | | | |
|---|---|---|---|
| 4,300,123 | 11/1981 | McMillin et al. | 235/456 X |
| 4,629,876 | 12/1986 | Kubota et al. | 235/462 X |
| 5,050,231 | 9/1991 | Watanabe et al. | 235/448 X |
| 5,128,519 | 7/1992 | Tokuda | 235/462 X |
| 5,164,574 | 11/1992 | Ujii et al. | 235/462 |
| 5,317,139 | 5/1994 | Evans et al. | 235/454 X |
| 5,326,963 | 7/1994 | Knapp et al. | 235/462 X |
| 5,369,262 | 11/1994 | Dvorkis et al. | 235/454 X |
| 5,376,780 | 12/1994 | Klueter | 235/454 X |
| 5,430,284 | 7/1995 | Numazaki | 235/472 X |

*Primary Examiner*—Donald T. Hajec
*Assistant Examiner*—Thien Minh Le
*Attorney, Agent, or Firm*—Wenderoth, Lind & Ponack

[57] ABSTRACT

A code data reading apparatus for photographic film comprises a light emitter 23, lenses 22a and 22b, and a sensor 21. Wherein a bar code 24 recorded on a film F is exposed to light from the light emitter 23 and the enlarged optical image is projected by the lenses 22a and 22b on the detecting surface of the sensor 21.

6 Claims, 6 Drawing Sheets

CODE DATA READ APPARATUS FOR PHOTOGRAPHIC FILM

This application is a continuation of now abandoned application, Ser. No. 08/343,941, filed Nov. 17, 1994.

BACKGROUND OF THE INVENTION

The present invention relates to a code data reading apparatus for photographic film which is capable of reading a bar code data from a photographic film with a camera or print station.

In a photographic printing process, a film is advanced by a film feeder until its frame to be printed comes to an exposure means and is projected for printing the frame on a sheet of photosensitive paper which is then subjected to a developing process. For printing a desired picture, its relevant data, e.g. ID(DX) code and frame number, recorded in a bar-code format on the negative film is detected and read with an optical sensor to identify the frame and obtain the conditions for the developing process. To do so, the film feeder is provided with a light emitter, e.g. LED, and a bar code detector for reading the bar code of the desired frame from the film.

One such code data reading apparatus for photographic film is disclosed in Japanese Patent Laid-open Publication 4-350646 (1992) which employs a CCD line sensor as the bar code detector. The CCD line sensor scans a target frame of a negative film to read specific sets of pixels at four points and, simultaneously, identify a bar code from a row of pixels extending widthwise of a negative film.

Another code data reading apparatus for photographic film is described in Japanese Patent Laid-open Publication 4-310938 (1992) where an optical image of a bar code is produced by a light emitter, focused by a lens, and received by a bar code detector (or sensor). In particular, a slit plate having a slit opening arranged therein to be smaller in a width than the smallest stripe of the bar code is disposed between the lens and the bar code detector. As the bar code detector receives an intensity of light passed through the slit, it can read the bar code which has been recorded at high density.

Also, a further code data reading apparatus is disclosed in Japanese Patent Laid-open Publication 5-19367 (1993) which employs a specific code detecting method for increasing the accuracy of reading of a bar code data from a negative film with no use of any high-precision optical sensor. According to the code detecting method, the base (blank) and the code (stripe) of a bar code are detected and converted to their respective minimum and maximum signals of peak values with a common optical sensor. The peak values are then compared with predetermined thresholds to examine whether or not they represent the base and code of the bar code.

It is important for correctly reading the bar code with the bar code reading apparatus to ensure that the negative film is not undulated and is prevented from stagger movements during the transfer. Commonly, the width of the transfer passage for the negative film is minimized to prevent the stagger movements or the bar code detector is mounted to a frame member which is movable to trace the stagger movements of the film, thus allowing the bar code detector to read the bar code of the negative film as being located at a distance inwardly from one edge of the film.

Although the above prior art read apparatuses are designed to read the bar code data correctly from the negative film, no one but the first mentioned read apparatus can have a scheme for correctly reading the bar code data from the negative film which is undulated at its surface or travels with stagger movements.

The first prior art apparatus permits the line sensor to detect the widthwise end (or side edge) of a negative film and specify the pixels representing a bar code with reference to the widthwise end so that it reads the bar code data from the negative film which travels with stagger movements. It however fails to eliminate the problem that, as travel path of the negative film is not straight, undesired margins of light are passed between the film and its guide and/or through the bar code blanks thus interfering with the main transmission of light across the bar code and causing the reading of the bar code data to be difficult.

If the transfer passage for the negative film is narrowed for prevention of the film from traveling in stagger movements, the likelihood is increased of jamming the film in the passage. During traveling in stagger movements, the negative film allows the direct radiation of light from the light emitter to pass off its widthwise edge to the detector. As a difference in the intensity on the detecting surface of a sensor between the bar and blank transmitted lights through a bar code is decreased, a bar stripe signal produced by the detector is less distinguished from the signal representing the blank of the bar code. In other words, the transmission of light through the bar stripes of the bar code is hardly discriminated thus causing a reading error. In the case of undulation of the negative film, portions of the direct radiation of light from the light emitter may be passed through the perforations of a negative film to the detector, resulting in a reading error.

The foregoing problems will be explained in more detail referring to FIGS. 5 and 6. As shown, a sensor 21 is commonly disposed as close to a light emitter 23 as possible. The optical sensitivity of the sensor 21 is increased for enhancing the electrical accuracy. Also, the sensor 21 is adapted such that the detectable width Ws on its detecting surface is substantially equal to the width of the smallest bar stripe F' or blank F" of a bar code to minimize a power requirement for amplification of its output signal in an amplifier. Accordingly, even if the bar of the bar code on a negative film F is located just under the sensor 21 and exposed to the radiation of light from the light emitter 23 as shown in FIG. 5, a low intensity of light a2 passed through the bar stripe of the bar code is partially joined with high intensities of light b and c passed through the two blanks on both preceding and proceeding sides of the bar. As the result, the total intensity of light incident on the detecting surface 21a of the sensor 21 is not minimized and thus, a difference between the total intensity and the maximum intensity of light will become small.

It is ideal for transfer of the negative film that the film is driven with its two edges being guided by the passage of the film of which width L is not greater than that of the film. As shown in FIG. 6, two beams of light d1 and e1 emitted from the light emitter 23 are directed to the negative film F and then, transmitted portions d2 and e2 of the light beams after passing the film F fall on to the detecting surface 21a of the sensor 21. Accordingly, a difference in the intensity of light between the light transmitted through bar and the light transmitted through a blank of a bar code can be acknowledged. However, during the transfer, the negative film F is loaded with unwanted stress or strain and will thus cause jamming. In practice, the width L of the film passage is arranged to be larger than that of the film F, as shown in FIG. 6.

When case that the negative film F is undulated or staggered while traveling along the passage, portions f and g of the light directed from the light emitter 23 to the film F are permitted to pass through the perforations of or off the edge of the film F but not through the bar or blank of the bar code and run to the sensor 21 directly or indirectly as reflected on the walls of the film passage. This causes the intensity of light passed through the bar stripe to be amplified on the detecting surface of the sensor 21 with the unwanted light portions f and g propagated through the perforations of or off the edge of the film F. Accordingly, the total intensity of light received by the detecting surface of the sensor 21 is not minimized and thus, a difference in the intensity between the bar and blank transmitted lights becomes small. As the result, the intensity of light passed through the bar of the bar code will be less distinguished, thereby generating a reading error.

When the bar code detector is mounted to a movable member to trace the undulated surface of a negative film, its action depends on the smoothness of its mechanical movement. If the mechanism is fouled with dirt or dust, it causes a jerky action of the bar code detector impairing the reading of a bar code. Also, the movable member is disposed on an intermediate region of the film passage thus increasing the possibility of film jamming.

In any case, the detector which is set with its light detecting distance larger than the width of the smallest of the bar stripes or blanks of a bar code receives at one time two different intensities of light passed through both the bar and blank of the bar code and thus produces an electric signal which is closer to the signal representing the the blank. Accordingly, the difference in the intensity on the detecting surface of the sensor between the bar and blank transmitted lights becomes small. As the result, the intensity of light passed through the bar of the bar code will be less distinguished, thereby generating a reading error.

It is an object of the present invention to provide an improved code data reading apparatus in which, while a negative film is transferred along the passage of a feeder having such a width as not to cause jamming of the film, a bar code recorded on the negative film is projected by an enlarging means on the detecting surface of a sensor so that a difference in the intensity on the detecting surface of a sensor between the bar and blank transmitted lights through the bar code can be increased regardless of unwanted fractions of light passed off the edge of the film. Accordingly, reading error is eliminated and the bar code data can be read correctly.

SUMMARY OF THE INVENTION

For achievement of the above object, a code data read apparatus for photographic film according to the present invention comprises a light emitting means for directing a beam of light to a bar code consisting of bars and blanks and recorded on a photographic negative film, an imaging means for focusing an intensity of light to pass through the bar code for enlarged projection, and a code data detector disposed at the focusing point of the imaging means for producing an electric signal corresponding to the intensity of light incident on its detecting surface.

Preferably, the imaging means comprises two rod lenses located between the negative film and the detector for tracing of two tracks respectively across the bar code so that an enlarged image of the smallest of the bars or blanks of the bar code recorded on the film is larger in the width than the detecting surface of the detector.

In operation, the light transmitted through the bar code on the negative film is focused by the imaging means on to the detecting surface of the detector to produce an enlarged image. Accordingly, as the negative film is transferred, an enlargement of its bar code moves across the detecting surface of the detector. This provides the same effect as of the detecting surface of the detector made smaller in the width than the bar or blank. As the result, the detector can receive only the intensity of light passed through the bar or blank of a bar code and clearly distinguish between the bar and blank transmitted lights through the bar code.

Even if unwanted fractions of light fall on the detecting surface of the detector because they were not blocked but passed through the perforations of or off the edge of the negative film which is undulated or staggered during the transfer, they are also enlarged by the imaging means and spaced by a distance proportional to the rate of enlargement from the bar or blank image. Due to an imaginary effect of decreasing the width of the detecting surface of the detector relation to the film size, the detector can detect only the intensity of light passed through the bar or blank of a bar code.

The imaging means comprising two rod lenses is most preferred because it is capable of detecting at optimum a difference in the intensity between the bar and blank transmitted lights for identifying the bar code data and also, having a shorter focal distance thus contributing to the minimum size of the apparatus.

DETAILED DESCRIPTION OF THE PREFERRED EMBODIMENT

One preferred embodiment of the present invention will be described in detail referring to the accompanying drawings.

Figure 1:
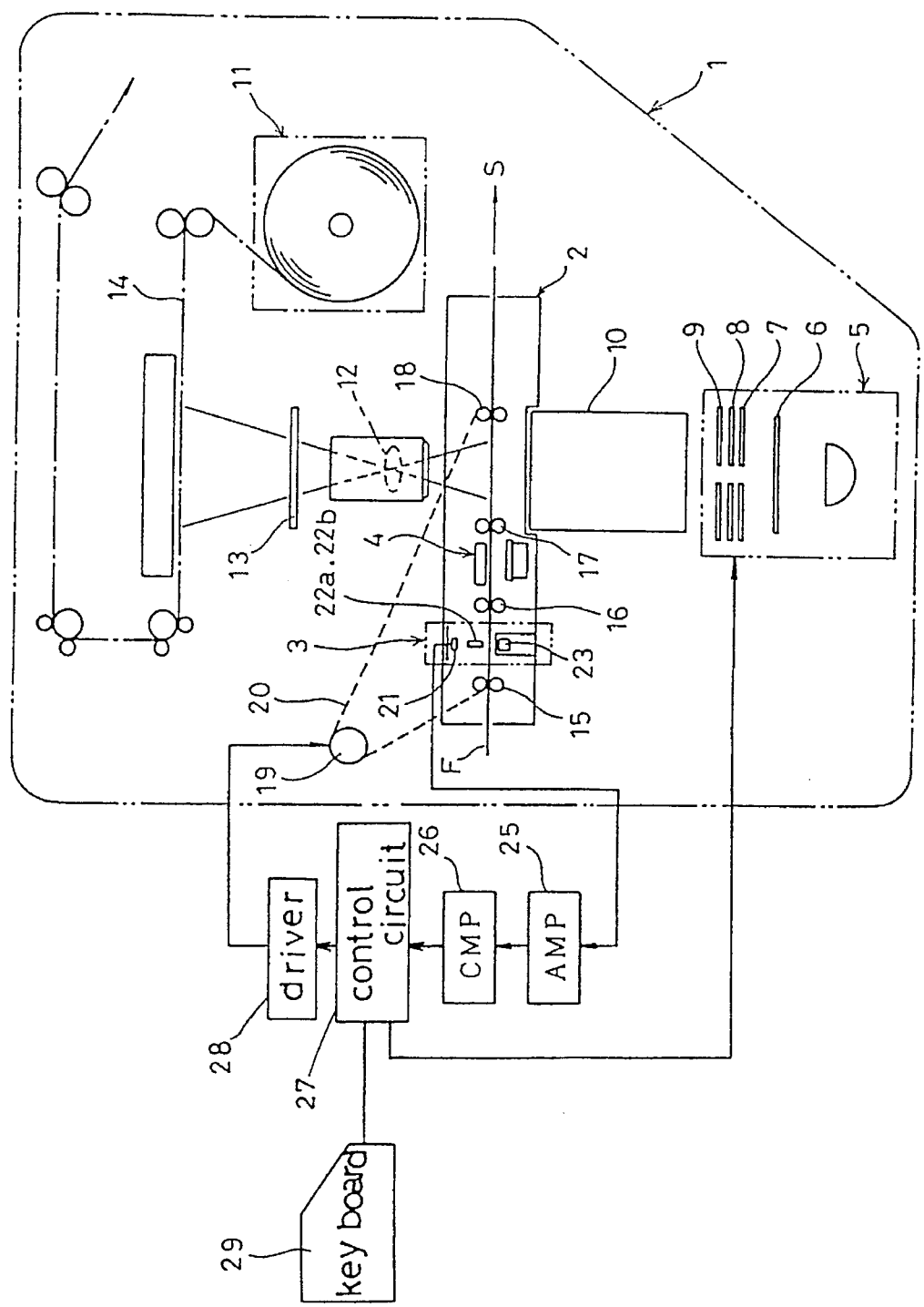
FIG. 1 is a schematic view of a code data reading apparatus in a photographic printer showing a preferred embodiment of the present invention.

FIG. 1 illustrates a photographic print apparatus (printer) provided with a code data reading apparatus for photographic film. As shown, a lamp housing 5 containing a halogen lamp, and a mirror tunnel 10, are disposed beneath a negative film carrier 2 through which a length of negative film F is transferred. The lamp housing 5 also contains therein a heat absorbing filter 6 and a light adjusting filter unit. The light adjusting filter unit comprises three, yellow(Y), magenta(M), and cyan(C), primary color filters 7, 8, and 9.

A lens 12, a shutter 13, and a photosensitive paper 14 are provided in a row above the negative film carrier 2. In action, a beam of light emitted from the lamp housing 5 is passed through the color filters 7, 8, and 9, the mirror tunnel 10, and the negative film F and is focused by the lens 12 on the paper 14 for producing an optical image. There is also provided a paper magazine 11.

The negative film carrier 2 has four pairs of feeder rollers 15, 16, 17, and 18 arranged at given intervals for transfer of both edges of the negative film F inbetween. A frame sensor 4 is disposed adjacent to the feeder rollers 17 and widthwise of the negative film F. At one side of the film F, a code data detector 3 is provided comprising a sensor 21, two lenses 22a and 22b, and a light emitter 23. While the light emitter 23 is disposed beneath the film F, the two lenses 22a and 22b are disposed above the film F for focusing the beam of light emitted by the emitter 23 and passed through the film F. The sensor 21 is disposed at the conjugate points of the two lenses 22a and 22b so that it can read the data of a bar code on the negative film F which has been projected at a given rate of magnification.

Figure 2:
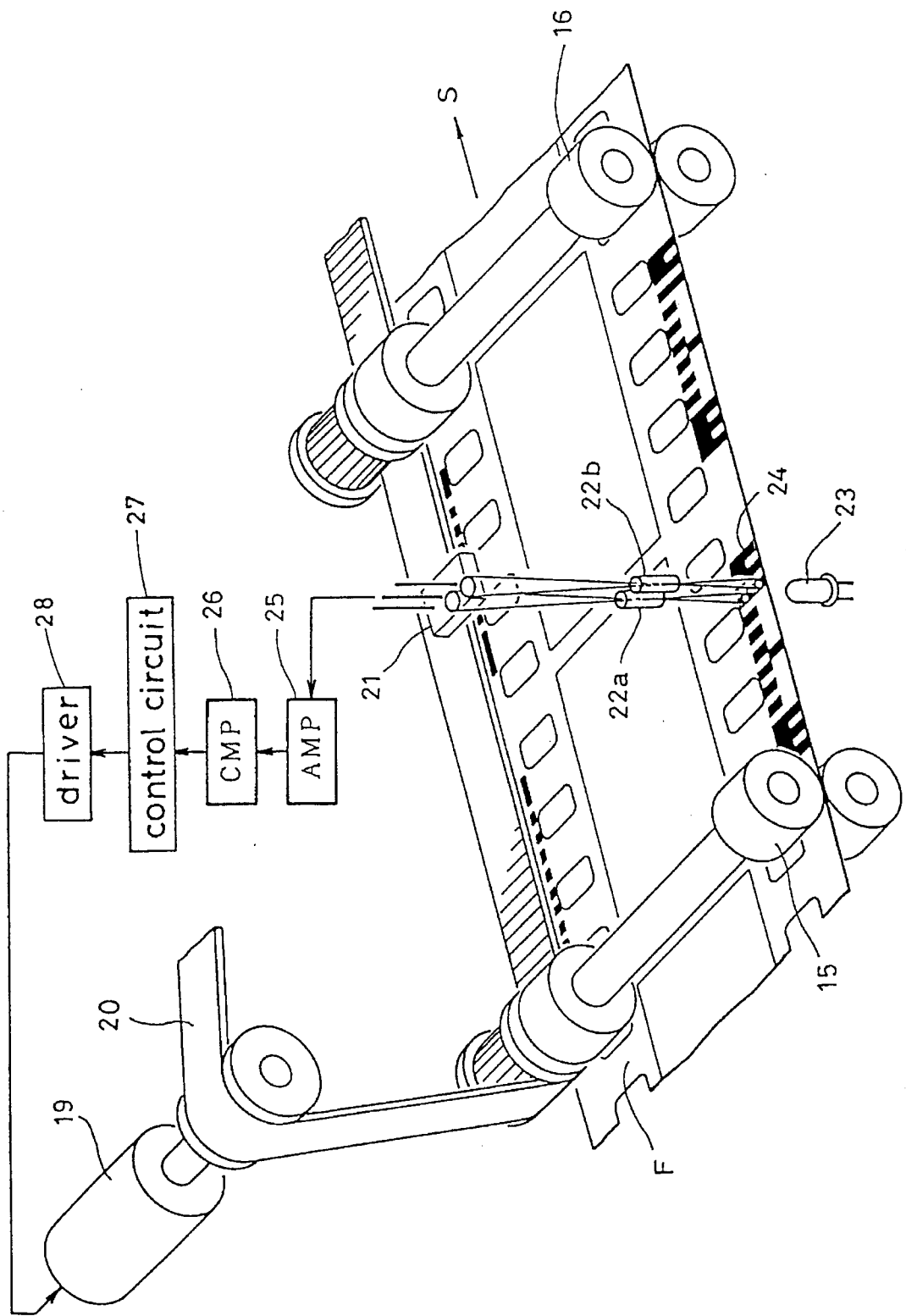
FIG. 2 is an enlarged perspective view of the code data read apparatus.
Figure 3:
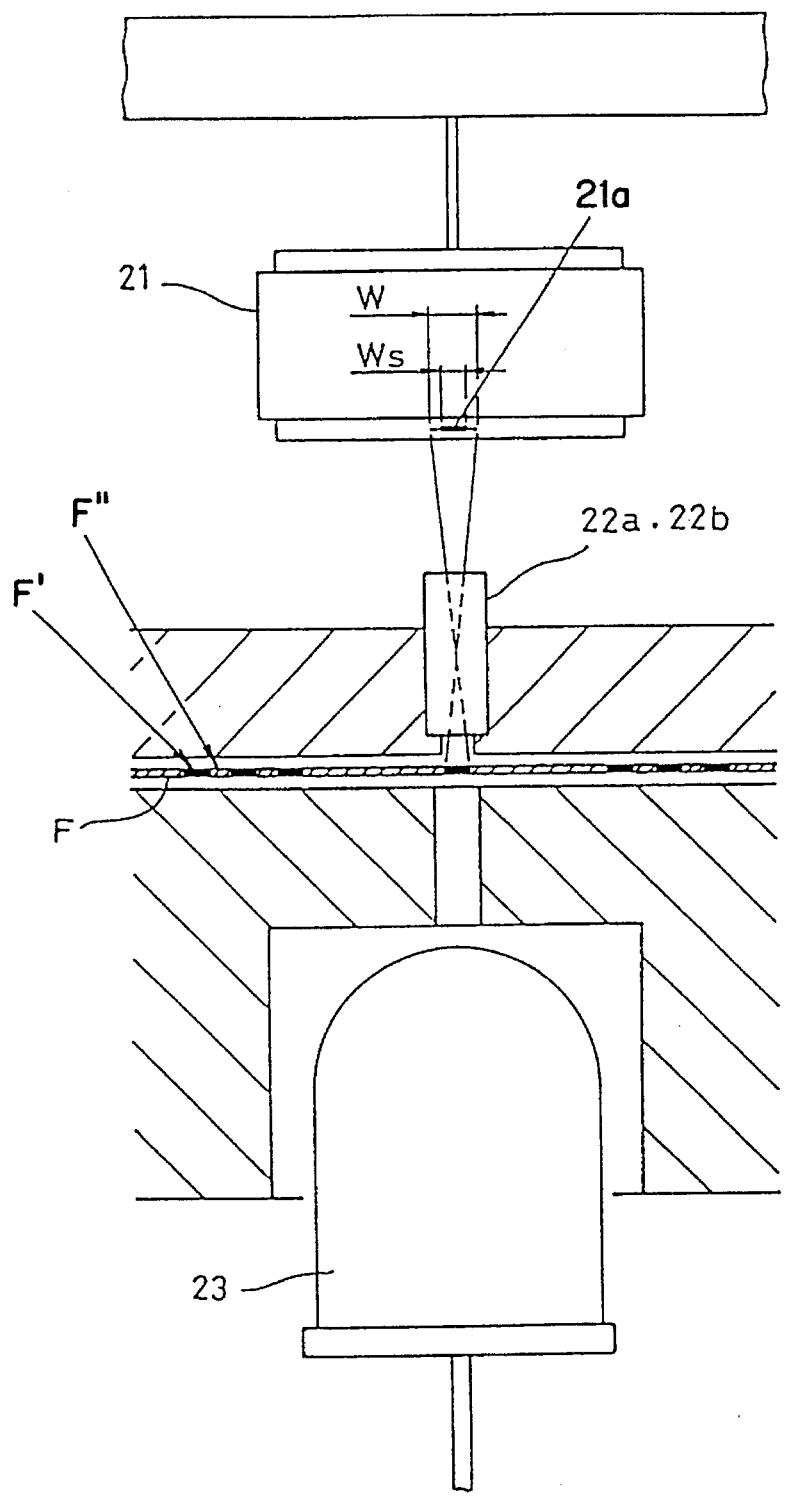
FIG. 3 is a cross-sectional partial view taken lengthwise of the passage for a negative film in the apparatus.
Figure 4:
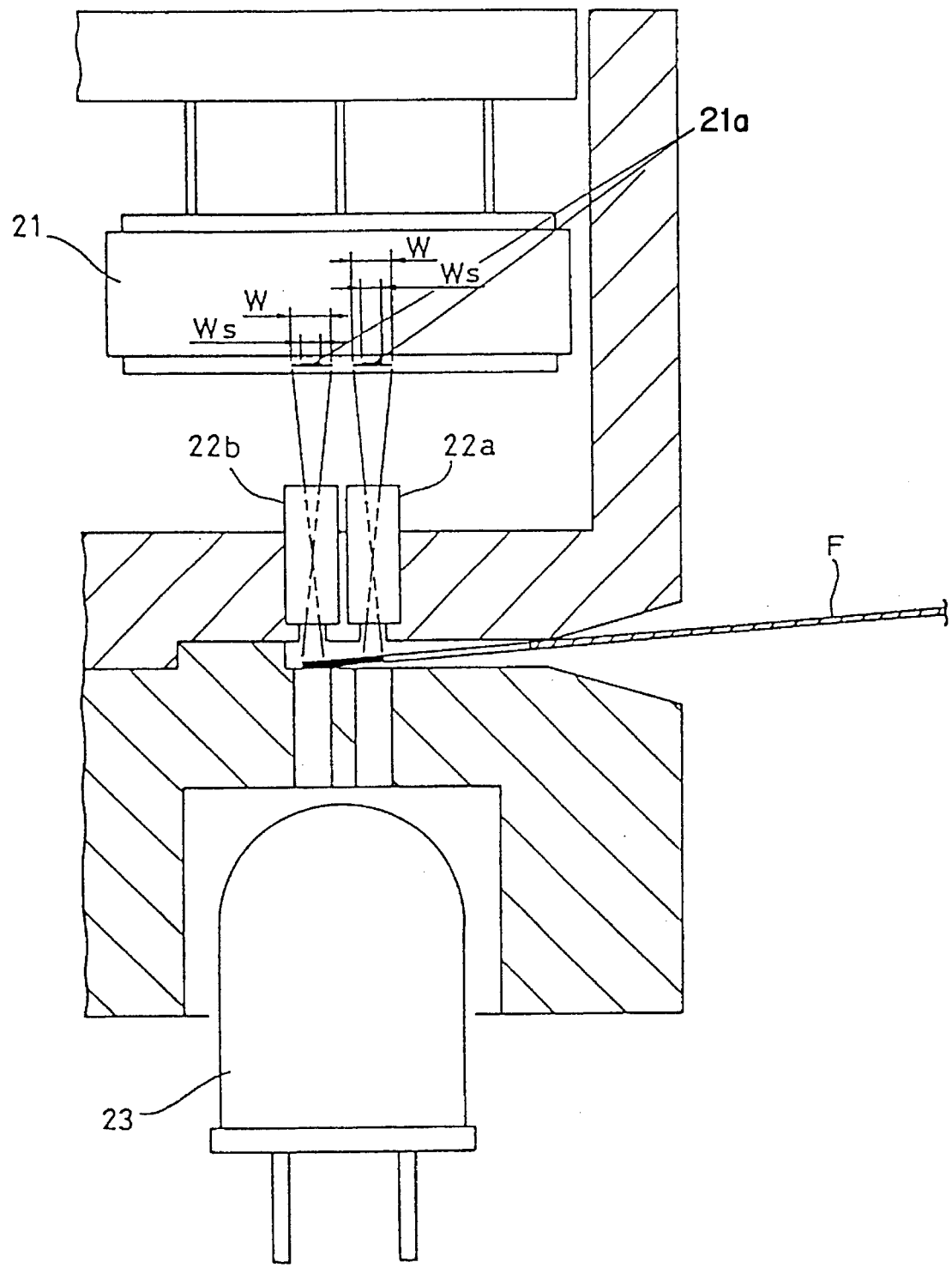
FIG. 4 is a cross-sectional partial view taken width-wisely of the passage in the apparatus.
Figure 5:
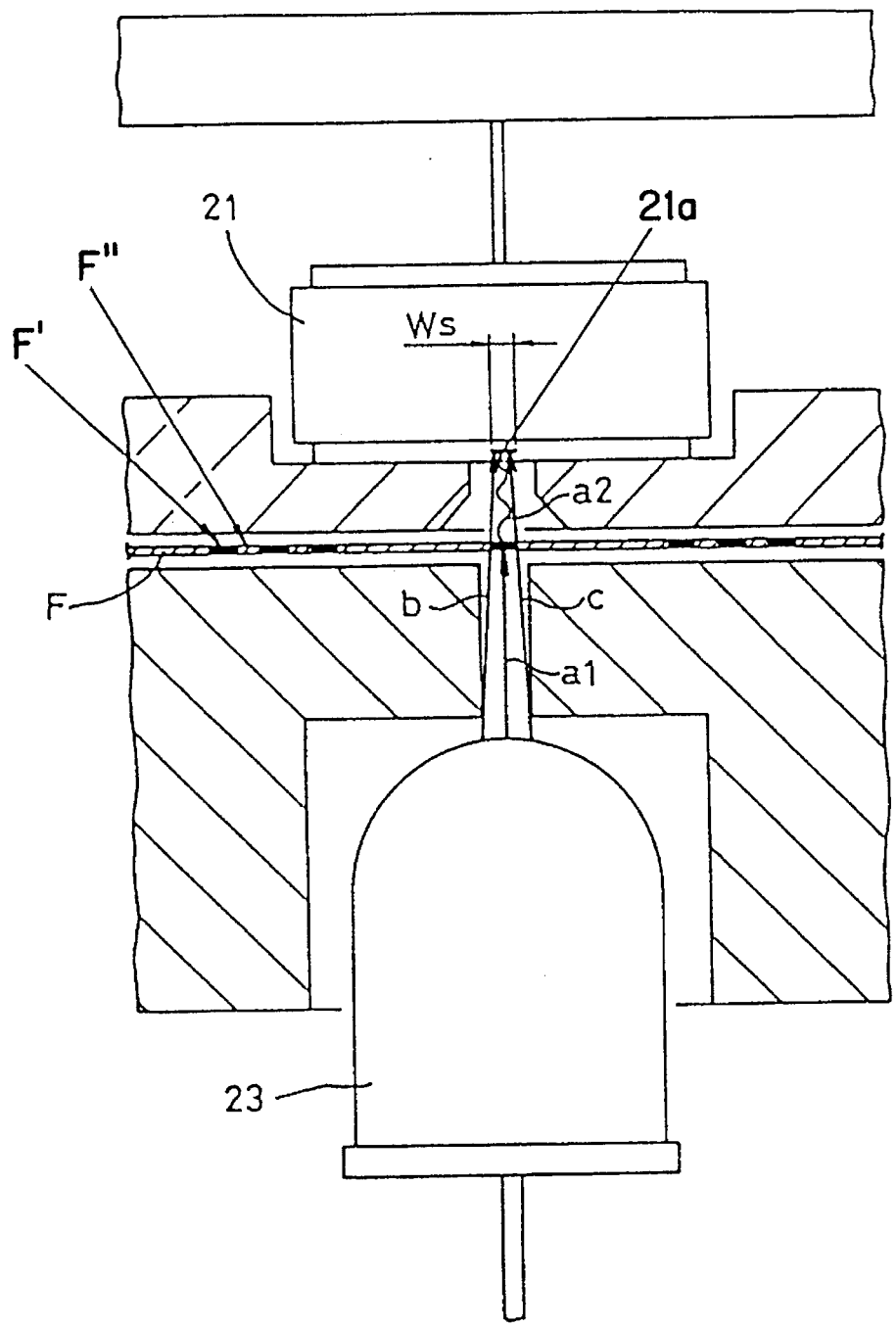
FIG. 5 is a cross-sectional partial view of a prior art apparatus similar to FIG. 3.
Figure 6:
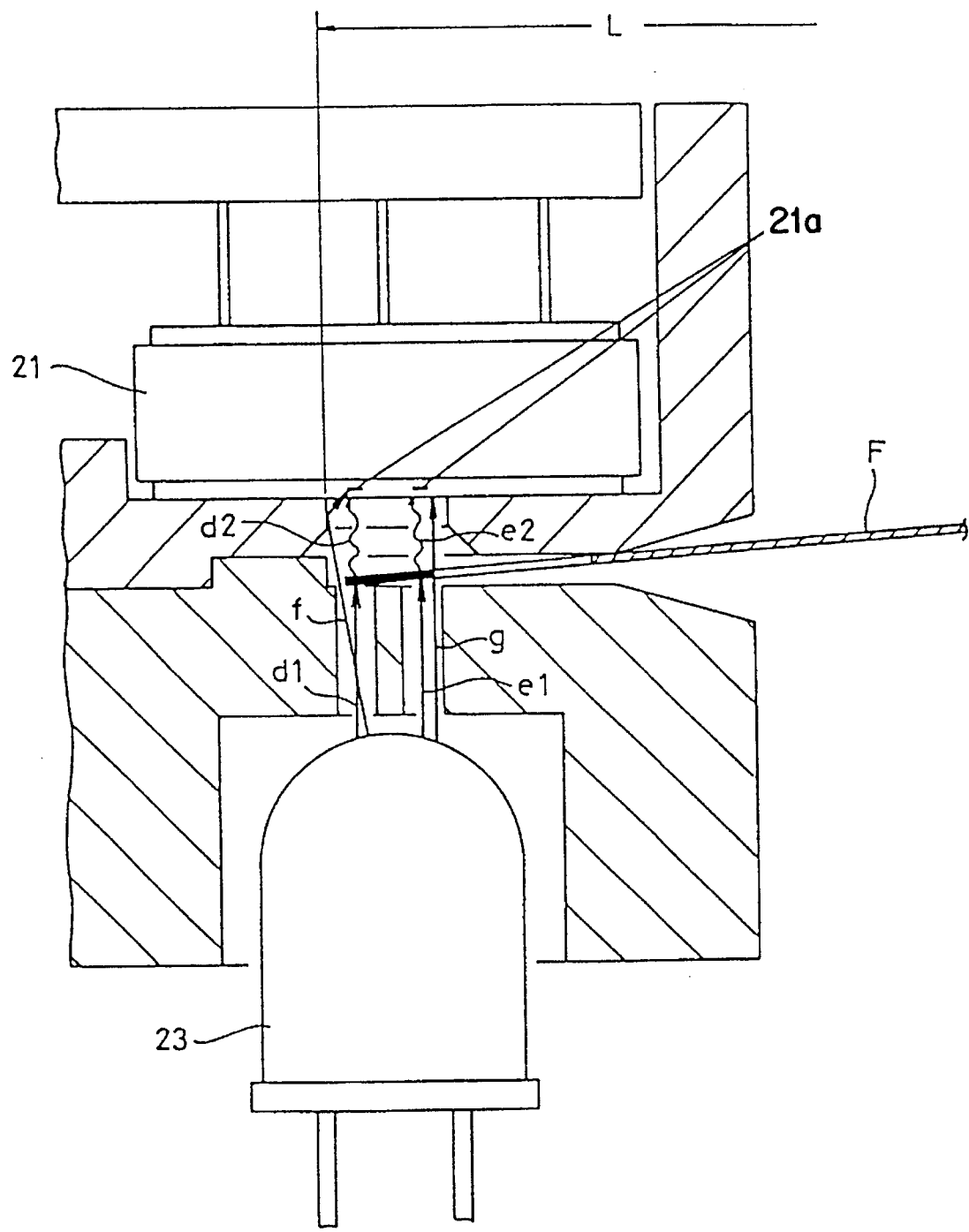
FIG. 6 is a cross-sectional partial view of the prior art apparatus similar to FIG. 4.

The sensor 21 may be a photoelectric device such as a photo diode and the light emitter 23 may be an LED. The two lenses 22a and 22b for focusing an enlargement of the bar code on the negative film F on the detecting surface of the sensor 21 may be specific rod lenses (e.g. commercially available Selfoc microlenses) which are as small as 1 mm in diameter and different in the reflective index from the ambient phase. Accordingly, the bar code 24 recorded on the negative film F can optically be detected and read. FIG. 2 is an enlarged perspective view showing the above described arrangement of the sensor 21, rod lenses 22a and 22b, light emitter 23, and bar code 24.

The sensor 21 is electrically connected to the input of an amplifier (AMP) 25 of which output is coupled to one of two inputs of a comparator (CMP) 26. The other input of the comparator 26 is connected to an unshown source means for receipt of a reference voltage. The output of the comparator 26 is connected to a control circuit 27 which comprises a microcomputer equipped with a keyboard 29 for entry of data. The output of the control circuit 27 is connected by a driver 28 to a motor 19. The motor 19 is coupled with belts 20 for rotating the feeder rollers 15, 16, 17, and 18. When the motor 19 rotates at a constant speed, the feeder rollers 15, 16, 17, and 18 drive the negative film F to travel at a predetermined speed.

The operation of the embodiment will now be explained.

A negative film F having a series of bar codes on either edge thereof is loaded on to the negative film carrier 2. As shown in FIG. 2, the bar code 24 is exposed to the beam of light emitted from the light emitter 23 of the code data detector 3 and its enlarged optical image is projected by the two lenses 22a and 22b on the detecting surface of the sensor 21 which in turn produces an electric signal corresponding to the intensity of received light. While the motor 19 rotates at a constant speed, the feeder rollers 15 forward the film 2 at a desired speed. As the film F is advanced in the direction denoted by S in FIG. 2, the enlarged image of the bar code 24 comprising blanks F" and bars F' travels in the opposite direction on the detecting surface of the sensor 21.

For reading the bar code 24 of the film F, the magnification rate M is determined so that when the detecting surface 21a of the sensor 21 has a width Ws, the width W of the smallest stripe of the bar code 24 in the enlarged image is larger than Ws (W/Ws>1). As the result, when the sensor 21 receives an optical image of the bar code 24, its detecting surface is completely shaded as filled with the enlarged bar stripe. More specifically, the intensity of light incident on the detecting surface 21a of the sensor 21 will be a minimum.

When the detecting surface of the sensor 21 is exposed to the blank of the bar code 24, it receives the full or maximum intensity of light which has directly passed through the blank between bars and bar never been blocked. Accordingly, a difference between the minimum and maximum intensities of light passed through the bar code 24 will be optimum. As the bar code 24 having a pattern of the blanks and bars travels in the direction of S, the sensor 21 receives the intensity of light at intervals and produces a signal corresponding to the pattern.

The signal of the sensor 21 is fed to the amplifier 25 where it is amplified at a given rate of amplification. The amplified signal of the amplifier 25 is transferred to the comparator 26 where it is compared with the reference voltage. If the signal is higher than the reference voltage, a high level output is released from the comparator 26. If it is smaller, a low level output is delivered. The low level output of the comparator 26 represents the bar of the bar code 24. A set of the outputs of the comparator 26 is transmitted to the control circuit 27 where its data of the bar code 24 is converted to an instruction of printing format. As set forth above, the apparatus of the present invention allows the difference in the intensity on the detecting surface of the sensor 21 between the bar and blank transmitted lights through the bar code 24 to be increased thus having the reference voltage selectable from a wider range. In addition, the detection of the bar code 24 will be enhanced with reduction of read error because the voltage change due to deterioration with time is less affected.

For correct detection of the bar code 24 widthwise of the negative film F, the two lenses 22a and 22b are aligned to focus their respective enlarged images of the bar code 24 on the detecting surface of the sensor 21. If the film F is undulated or staggered during the transfer, it allows portions of the light directed from the light emitter 23 to the film F to pass through its perforations or off its edge. However, the portions of the light are focused by the rod lenses 22a and 22b on the points isolated from the detecting surface of the sensor 21 where an enlargement of the bars and blanks of the bar code 24 is projected. More specifically, the sensor 21 is intended to detect an intensity of light which has been passed through such a particular region of the film F as defined by Ws/M. This will increase the allowance for stagger movement and undulation of the negative film F in the film passage of the apparatus and thus, permit the reference voltage to be selected from a wider range so that the consistent detection of the bar code is guaranteed, It will be understood that the embodiment of the present invention is exemplary and not limited to the negative film, but may employ with equal success other applicable films including a reversal film for direct printing.

What is claimed is:

1. A code data reading apparatus for reading a bar code of bars and blanks formed on a film, said code data reading apparatus comprising:

a light emitting means for directing a beam of light toward the bar code formed on the film;

a code data detector including at least one detecting surface disposed in a path of the light emitted by said light emitting means for receiving light from said light emitting means after the light has passed through the bar code, and for producing an electric signal corresponding to an intensity of the light incident on said at least one detecting surface;

an imaging means for focusing, onto said at least one detecting surface, the light emitted by said light emitting means and passed through the bar code, so as to project onto said at least one detecting surface an enlarged image of the bars and blanks where the enlarged image of a narrowest of the bars and blanks projected onto said at least one detecting surface is of a greater width than said at least one detecting surface, so that the intensity of light incident on said at least one detecting surface is not affected by stagger movements of the film; and wherein said imaging means comprises two rod lenses for tracing of two tracks, respectively, across the bar code.

2. A code data reading apparatus as recited in claim 1, wherein said two rod lenses are disposed between the film and said code data detector.

3. A code data reading apparatus for reading a bar code of bars and blanks formed on a film having a film width, said code data reading apparatus comprising:

a light emitting means for directing a beam of light toward the bar code formed on the film;

a code data detector including at least one detecting surface disposed in a path of the light emitted by said light emitting means for receiving light from said light emitting means after the light has passed through the bar code, and for producing an electric signal corresponding to an intensity of the light incident on said at least one detecting surface;

an imaging means for focusing, onto said at least one detecting surface, the light emitted by said light emitting means and passed through the bar code, so as to project onto said at least one detecting surface an enlarged image of the bars and blanks where a length in a film-width direction of the enlarged image of a shortest of the bars and blanks projected onto said at least one detecting surface is greater than a length in the film width direction of said at least one detecting surface, so that the intensity of light incident on said at least one detecting surface is not affected by stagger movements of the film; and wherein said imaging means comprises two rod lenses for tracing of two tracks, respectively, across the bar code.

4. A code data reading apparatus as recited in claim 3, wherein said two rod lenses are disposed between the film and said code data detector.

5. A code data reading apparatus for reading a bar code of bars and blanks formed on a film travelling in a film-transfer direction, said code data reading apparatus comprising:

a light emitting means for directing a beam of light toward the bar code formed on the film;

a code data detector including at least one detecting surface disposed in a path of the light emitted by said light emitting means for receiving light from said light emitting means after the light has passed through the bar code, and for producing an electric signal corresponding to an intensity of the light incident on said at least one detecting surface;

an imaging means for focusing, onto said at least one detecting surface, the light emitted by said light emitting means and passed through the bar code, so as to project onto said at least one detecting surface an enlarged image of the bars and blanks where a width in the film-transfer direction of the enlarged image of a narrowest of the bars and blanks projected onto said at least one detecting surface is greater than a width in the film-transfer direction of said at least one detecting surface, so that the intensity of light incident on said at least one detecting surface is not affected by stagger movements of the film; and wherein said imaging means comprises two rod lenses for tracing of two tracks, respectively, across the bar code.

6. A code data reading apparatus as recited in claim 5, wherein said two rod lenses are disposed between the film and said code data detector.

* * * * *